US009889411B2

(12) United States Patent
Soyama et al.

(10) Patent No.: US 9,889,411 B2
(45) Date of Patent: Feb. 13, 2018

(54) NONWOVEN FABRIC FOR SEMIPERMEABLE MEMBRANE SUPPORT

(71) Applicant: HOKUETSU KISHU PAPER CO., LTD., Niigata (JP)

(72) Inventors: Toshihiko Soyama, Niigata (JP); Junji Nemoto, Niigata (JP); Hisashi Hamabe, Tokyo (JP)

(73) Assignee: HOKUETSU KISHU PAPER CO., LTD., Niigata (JP)

( * ) Notice: Subject to any disclaimer, the term of this patent is extended or adjusted under 35 U.S.C. 154(b) by 0 days.

(21) Appl. No.: 14/360,319

(22) PCT Filed: Jan. 11, 2013

(86) PCT No.: PCT/JP2013/050452
§ 371 (c)(1),
(2) Date: May 23, 2014

(87) PCT Pub. No.: WO2013/108722
PCT Pub. Date: Jul. 25, 2013

(65) Prior Publication Data
US 2015/0174535 A1   Jun. 25, 2015

(30) Foreign Application Priority Data
Jan. 16, 2012 (JP) ................... 2012-006521

(51) Int. Cl.
| | |
|---|---|
| *B01D 69/10* | (2006.01) |
| *C02F 1/44* | (2006.01) |
| *B01D 69/12* | (2006.01) |
| *D21H 13/24* | (2006.01) |
| *B32B 5/02* | (2006.01) |

(52) U.S. Cl.
CPC ............ *B01D 69/10* (2013.01); *B01D 69/12* (2013.01); *C02F 1/441* (2013.01); *C02F 1/444* (2013.01); *D21H 13/24* (2013.01); *B32B 5/022* (2013.01); *B32B 2250/03* (2013.01);
(Continued)

(58) Field of Classification Search
CPC ...... B01D 69/10; B01D 69/12; B01D 69/122; B01D 69/105; B01D 39/14; B01D 39/16; B01D 39/1623; B01D 39/163; B01D 2239/0208; B01D 2239/0618; B01D 2239/0622; B01D 2239/065; B01D 2239/0654; B01D 2239/0668; B32B 2250/03; B32B 2255/02; B32B 2255/26; B32B 2262/0276; B32B 2262/0284; B32B 5/022; B32B 7/02; B32B 2307/72; B32B 2250/20; B32B 2250/24; B32B 2250/26; B32B 2250/40; B32B 5/14; B32B 5/145; Y10T 442/60; Y10T 442/607

See application file for complete search history.

(56) References Cited

U.S. PATENT DOCUMENTS

| | | | |
|---|---|---|---|
| 3,595,731 A | * | 7/1971 | Davis ................. D04H 1/485 156/148 |
| 5,851,355 A | | 12/1998 | Goettmann |

(Continued)

FOREIGN PATENT DOCUMENTS

| | | |
|---|---|---|
| CN | 1602225 | 3/2005 |
| CN | 102188910 A | 9/2011 |

(Continued)

OTHER PUBLICATIONS

International Preliminary Report on Patentability dated Jul. 31, 2014 corresponding to PCT/JP2013/050452, 2 pp.
Written Opinion of the International Searching Authority dated Feb. 26, 2013 corresponding to PCT/JP2013/050452, 7 pp.
European Search Report dated Sep. 2, 2015 from corresponding European Application No. 13738682.7, 7 pages.
Korean Office Action dated Sep. 11, 2015, with translation, from corresponding Korean Application No. 10-2014-7017459, 7 pages.

*Primary Examiner* — Pranav Patel
(74) *Attorney, Agent, or Firm* — Ohlandt, Greeley, Ruggiero & Perle, LLP

(57) ABSTRACT

Provided is a nonwoven fabric for semipermeable membrane support, in which adhesiveness of a semipermeable membrane to a support is satisfactory, the thickness uniformity of the semipermeable membrane is satisfactory, and permeation-through of a coating liquid does not occur. Disclosed is a nonwoven fabric for semipermeable membrane support, in which when a region extending from the semipermeable membrane-coated side surface of the nonwoven fabric to a predetermined portion of the total basis weight in the thickness direction is designated as a coated layer region, a region extending from the non-semipermeable membrane-coated surface of the nonwoven fabric to a predetermined portion of the total basis weight in the thickness direction is designated as a non-coated layer region, and a region obtained by excluding the respective predetermined portions of the total basis weight in the thickness direction from both the semipermeable membrane-coated side surface and the non-semipermeable membrane-coated surface of the nonwoven fabric is designated as a middle layer region, the pressure drop per unit basis weight of the middle layer region after the exclusion is lower than the pressure drop per unit basis weight of the coated layer region and the pressure drop per unit basis weight of the non-coated layer region, and the pressure drop per unit basis weight of the middle layer region after the exclusion is in the range of 10% to 70% relative to the pressure drop per unit basis weight of the nonwoven fabric before the exclusion. The predetermined portion is defined to be about 25%.

9 Claims, No Drawings

(52) U.S. Cl.
CPC ..... *B32B 2250/20* (2013.01); *B32B 2307/724* (2013.01); *B32B 2307/726* (2013.01)

(56) References Cited

U.S. PATENT DOCUMENTS

| | | | |
|---|---|---|---|
| 2002/0056535 A1* | 5/2002 | Hama | B01D 69/10 |
| | | | 162/136 |
| 2005/0087070 A1 | 4/2005 | Odaka et al. | |
| 2008/0138596 A1* | 6/2008 | Yoshida | B01D 39/163 |
| | | | 428/220 |
| 2010/0133173 A1* | 6/2010 | Inagaki | B01D 39/1623 |
| | | | 210/504 |
| 2010/0285101 A1* | 11/2010 | Moore | B32B 5/14 |
| | | | 424/445 |
| 2011/0309014 A1* | 12/2011 | Hosoya | B01D 39/1623 |
| | | | 210/500.1 |

FOREIGN PATENT DOCUMENTS

| | | |
|---|---|---|
| EP | 0199901 A2 | 12/1986 |
| EP | 1044719 A1 | 10/2000 |
| EP | 1462154 | 9/2004 |
| EP | 2659955 A1 | 11/2013 |
| EP | 2810702 A1 | 12/2014 |
| EP | 2821125 A1 | 1/2015 |
| ES | 2318058 | 5/2009 |
| JP | 60238103 | 11/1985 |
| JP | 10225630 | 8/1998 |
| JP | 11347383 | 12/1999 |
| JP | 2002095937 | 4/2002 |
| JP | 2009178915 | 8/2009 |
| JP | 2009233666 | 10/2009 |
| KR | 20110095164 A | 8/2011 |
| WO | 03049843 | 6/2003 |
| WO | 2006068100 A1 | 6/2006 |
| WO | WO2010073958 * | 7/2010 |
| WO | 2011049231 A1 | 4/2011 |

* cited by examiner

NONWOVEN FABRIC FOR SEMIPERMEABLE MEMBRANE SUPPORT

TECHNICAL FIELD

The present invention relates to a nonwoven fabric, and more particularly, to a nonwoven fabric for semipermeable membrane support intended for serving as a support for membrane production and reinforcing a semipermeable membrane in the production of a semipermeable membrane having an isolating function, such as an ultrafiltration membrane, a precision filtration membrane, or a reverse osmosis (RO) membrane.

BACKGROUND ART

Semipermeable membranes are widely used for the removal of impurities in beverages/industrial water, desalination of seawater, removal of saprophytic bacteria in foodstuffs, and a waste water treatment, or in the field of biochemistry and the like.

For the semipermeable membranes, various polymers such as a cellulose-based resin, a polyvinyl alcohol-based resin, a polysulfone-based resin, a polyamide-based resin, a polyimide-based resin, a polyacrylonitrile-based resin, a polyester-based resin, and a fluororesin are selected in accordance with the use. However, the membrane itself has weak strength, and cannot endure a high pressure such as 1 MPa to 10 MPa or more when used alone in ultrafiltration, reverse osmosis or the like. Thus, products in the form of having a semipermeable membrane formed by applying a resin liquid for a semipermeable membrane on one surface of a support having high strength and high liquid permeability, such as a nonwoven fabric or a woven fabric, are in use.

In order to obtain the liquid permeability and filtration performance required from a semipermeable membrane, it is necessary that a semipermeable membrane be formed at a uniform thickness on a semipermeable membrane support. Therefore, high smoothness is required from the surface where a semipermeable membrane will be coated in the semipermeable membrane support (hereinafter, also referred to as a semipermeable membrane-coated side surface). Furthermore, adhesiveness of the semipermeable membrane to the support (=anchor effect) is also required. However, if the semipermeable membrane support is made excessively smooth, when the semipermeable membrane coating liquid is applied, it becomes difficult for the coating liquid to cling to the support, adhesiveness of the semipermeable membrane to the support becomes poor, and the semipermeable membrane becomes easily detachable from the support. To the contrary, when the smoothness of the support is lowered, it becomes easy for a resin liquid to cling to the support by the anchor effect, and adhesiveness is improved. However, uniformity of the semipermeable membrane is deteriorated, and there occurs a problem that the coating liquid to be applied bleeds into the interior of the support and thereby permeates through to the non-coated surface. That is, in regard to the smoothness of the semipermeable membrane-coated side surface, uniformity of the thickness of the semipermeable membrane and the adhesiveness of the semipermeable membrane to the support are in a contradictory relationship.

It has been suggested to improve the adhesiveness of a semipermeable membrane coating liquid to a support by roughening the coated surface by adjusting the difference in the surface roughness between the semipermeable membrane-coated side surface of a nonwoven fabric for semipermeable membrane support and a non-coated surface to 15% (see, for example, Patent Literature 1).

As a nonwoven fabric for semipermeable membrane support, a support based on a bilayer structure of a front surface layer which uses a fiber having a larger diameter and has large surface roughness; and a back surface layer which uses a fiber having a finer diameter and has a dense structure, has been suggested (see, for example, Patent Literature 2).

As a nonwoven fabric for semipermeable membrane support, there has been suggested a support characterized by containing two or more kinds of main constituent synthetic fibers having different fiber diameters, and being formed from a nonwoven fabric in which a binder synthetic fiber, and the ratio of smoothness between a semipermeable membrane-coated side surface and a non-coated surface is 5.0:1.0 to 1.1:1.0 (see, for example, Patent Literature 3).

There has been suggested a support in which the average value of breaking lengths in the longitudinal direction (MD) and the transverse direction (CD) at the time of 5% elongation is 4.0 km or more, and the degree of air permeability is 0.2 cc/cm$^2$·sec to 10.0 cc/cm$^2$·sec (see, for example, Patent Literature 4).

There has been suggested a support in which adhesiveness to a semipermeable membrane has been increased by incorporating an atypically shaped cross-section fiber on the coated surface side layer of the semipermeable membrane (see, for example, Patent Literature 5).

There has been suggested a support having a three-layer structure in which an intermediate layer includes a melt-blown fiber having a fiber diameter of 5 μm or less (see, for example, Patent Literature 6).

There has been suggested a support in which prevention of the permeation-through of a semipermeable membrane coating liquid is attempted by incorporating pulp for papermaking into a layer on the non-coated surface side of the support having a multilayer structure (see, for example, Patent Literature 7).

CITATION LIST

Patent Literature

Patent Literature 1: JP 2002-95937 A
Patent Literature 2: JP 60-238103 A
Patent Literature 3: WO 2011/049231 A
Patent Literature 4: JP 10-225630 A
Patent Literature 5: JP 11-347383 A
Patent Literature 6: WO 2006/068100 A
Patent Literature 7: JP 2009-178915 A

SUMMARY OF INVENTION

Technical Problem

The technology of Patent Literature 1 has a problem that since the coated surface of the support is rough, the thickness uniformity of the semipermeable membrane is deteriorated.

The technology of Patent Literature 2 is intended to improve the adhesiveness of the semipermeable membrane coating liquid to the support by means of the front surface layer having high surface roughness. However, similarly, this also has a problem that the thickness uniformity of the semipermeable membrane is deteriorated because the coated surface of the support is rough.

In the technology of Patent Literature 3, contrary to Patent Literatures 1 and 2, the side of the semipermeable membrane-coated side surface is smoother than the non-coated surface. However, since incorporating a fiber having a large diameter generally increases air permeability of the support and decreases compactness, there is a problem that even if the smoothness of the coated surface is increased, the thickness uniformity of the coated semipermeable membrane is not so much improved.

In the technology of Patent Literature 4, the support has high strength and exhibits an effect of having small elongation; however, since the semipermeable membrane-coated side surface and the non-coated surface have the same smoothness, the relationship between the thickness uniformity of the semipermeable membrane and the adhesiveness of the semipermeable membrane to the support is fundamentally not addressed.

In the technology of Patent Literature 5, there is a problem that surface unevenness of the atypically shaped cross-section fiber deteriorates the thickness uniformity of the semipermeable membrane.

In the technology of Patent Literature 6, an effect of preventing permeation-through of the semipermeable coating liquid and an anchor effect can be obtained. However, since a fiber having a fine diameter is used in the intermediate layer, there is a problem that air permeability of the support becomes poor.

In the technology of Patent Literature 7, there is a problem that when the sheet containing pulp for papermaking is wetted with water upon actual use, the decrement in the strength of the sheet is increased, and air permeability becomes poor.

Regarding a nonwoven fabric for semipermeable membrane support, there is a demand for a nonwoven fabric in which adhesiveness of a semipermeable membrane to a support is satisfactory, the thickness uniformity of the semipermeable membrane is satisfactory, and permeation-through of a coating liquid does not occur. An object of the present invention is to provide a nonwoven fabric for semipermeable membrane support, in which adhesiveness of a semipermeable membrane to a support is satisfactory, the thickness uniformity of the semipermeable membrane is satisfactory, and permeation-through of a coating liquid does not occur.

Solution to Problem

A nonwoven fabric for semipermeable membrane support according to the present invention includes a nonwoven fabric containing organic synthetic fibers as a primary component, with one surface of the nonwoven fabric being a semipermeable membrane-coated side surface having a semipermeable membrane coated thereon, while the other surface being a non-semipermeable membrane-coated surface, wherein when a region extending from the semipermeable membrane-coated side surface of the nonwoven fabric to a predetermined portion of the total basis weight in the thickness direction is designated as a coated layer region, a region extending from the non-semipermeable membrane-coated surface of the nonwoven fabric to a predetermined portion of the total basis weight in the thickness direction is designated as a non-coated layer region, and a region obtained by excluding the respective predetermined portions of the total basis weight in the thickness direction from both the semipermeable membrane-coated side surface and the non-semipermeable membrane-coated surface of the nonwoven fabric is designated as a middle layer region, the predetermined portion of the total basis weight is a proportion in the range of 22.5% to 27.5% of the total basis weight of the nonwoven fabric, the pressure drop per unit basis weight of the middle layer region after the exclusion is lower than the pressure drop per unit basis weight of the coated layer region and the pressure drop per unit basis weight of the non-coated layer region, and the pressure drop per unit basis weight of the middle layer region after the exclusion is in the range of 10% to 70% relative to the pressure drop per unit basis weight of the nonwoven fabric before the exclusion.

In regard to the nonwoven fabric for semipermeable membrane support according to the present invention, the nonwoven fabric is preferably a wet nonwoven fabric. In a wet nonwoven fabric, since organic synthetic fibers as cut short fibers constitute a primary constituent element, air permeability of the middle layer is likely to be increased, and an anchor effect is likely to be exhibited.

In regard to the nonwoven fabric for semipermeable membrane support according to the present invention, it is preferable that the nonwoven fabric before being subjected to a hot press processing have a single layer structure. When hot press processing is carried out using a thermal calender, if the nonwoven fabric has a single layer structure, the way of heat propagation is uniform, and accordingly, control of the pressure drops of the various layer regions based on the processing conditions can be easily implemented.

In regard to the nonwoven fabric for semipermeable membrane support according to the present invention, it is preferable that the degree of thermal melting of the organic synthetic fibers of the middle layer region be lower than the degree of thermal melting of the organic synthetic fibers of the coated layer region and the non-coated layer region. By bringing the middle layer region of the nonwoven fabric into a semi-molten state, while making the degree of thermal fusion of the organic synthetic fibers in the coated layer region and the non-coated layer region higher than that of the middle layer region, compactness of the surface is attained in any of the semipermeable membrane-coated side surface or the non-coated surface.

In regard to the nonwoven fabric for semipermeable membrane support according to the present invention, any surface of the nonwoven fabric may be a semipermeable membrane-coated side surface.

In regard to the nonwoven fabric for semipermeable membrane support according to the present invention, it is preferable that the fibers incorporated into the nonwoven fabric be organic synthetic fibers.

The nonwoven fabric for semipermeable membrane support according to the present invention includes an embodiment in which the organic synthetic fibers include a main constituent fiber, and the main constituent fiber is one kind of polyester main constituent fiber.

Effect of the Invention

According to the present invention, a nonwoven fabric for semipermeable membrane support, in which adhesiveness of the semipermeable membrane to the support is satisfactory, the thickness uniformity of the semipermeable membrane is satisfactory, and permeation-through of a coating liquid does not occur, can be provided.

DESCRIPTION OF EMBODIMENTS

Next, the present invention will be described in detail by way of exemplary embodiments, but the present invention is not intended to be construed to be limited by these descriptions. As long as the effect of the present invention is provided, the exemplary embodiments may include various modifications.

The nonwoven fabric for semipermeable membrane support according to the present exemplary embodiment is a nonwoven fabric for semipermeable membrane support, which is a nonwoven fabric containing organic synthetic fibers as a primary component, with one surface of the nonwoven fabric being a semipermeable membrane-coated side surface having a semipermeable membrane coated thereon, while the other surface being a non-semipermeable membrane-coated surface, and in which when a region extending from the semipermeable membrane-coated side surface of the nonwoven fabric to a predetermined portion of the total basis weight in the thickness direction is designated as a coated layer region, a region extending from the non-semipermeable membrane-coated surface of the nonwoven fabric to a predetermined portion of the total basis weight in the thickness direction is designated as a non-coated layer region, and a region obtained by excluding the respective predetermined portions of the total basis weight in the thickness direction from both the semipermeable membrane-coated side surface and the non-semipermeable membrane-coated surface of the nonwoven fabric is designated as a middle layer region, the predetermined portion of the total basis weight is a proportion in the range of 22.5% to 27.5% of the total basis weight of the nonwoven fabric, the pressure drop per unit basis weight of the middle layer region after the exclusion is lower than the pressure drop per unit basis weight of the coated layer region and the pressure drop per unit basis weight of the non-coated layer region, and the pressure drop per unit basis weight of the middle layer region after the exclusion is in the range of 10% to 70% relative to the pressure drop per unit basis weight of the nonwoven fabric before the exclusion. As a result of employing such a configuration, the following can be realized: (1) when the pressure drop of the nonwoven fabric middle layer region is relatively decreased relative to the pressure drop of the surface layer region of the nonwoven fabric, the anchor effect of the resin coating liquid is enhanced, and satisfactory adhesiveness of the semipermeable membrane to the support is obtained; (2) when the pressure drop of the coated layer region of the semipermeable membrane in the surface layer region of the nonwoven fabric is not made equal to or lower than the pressure drop of the middle layer region, smoothness of the coated surface is maintained; and (3) when the pressure drop of the non-coated layer region of the semipermeable membrane in the surface layer region of the nonwoven fabric is not made equal to or lower than the pressure drop of the middle layer region, permeation-through of the semipermeable membrane coating liquid can be prevented. Furthermore, the coated layer region and the non-coated layer region are both proportions in the range of 22.5% to 27.5% of the total basis weight of the nonwoven fabric, and there is no, or if any, little, difference between the two regions. Therefore, any surface of the nonwoven fabric may be the semipermeable membrane-coated side surface. In the process of coating a semipermeable membrane, management of the front and the back of the nonwoven fabric is made easier. The coated layer region is a region in which a semipermeable membrane is coated on an arbitrarily selected surface between the two surfaces of the nonwoven fabric, and the non-coated layer region is a region on the reverse side. Meanwhile, the surface coated with a semipermeable membrane is one surface of the nonwoven fabric.

The organic synthetic fibers, which are primary constituent element of the nonwoven fabric that serves as a semipermeable membrane support, can be divided into a main constituent fiber and a binder fiber.

Examples of the main constituent fiber include fibers spun from synthetic resins such as polyethylene, polypropylene, polyacrylate, polyester, polyurethane, polyvinyl chloride, polyvinylidene chloride, polyethylene fluoride, polyaramid, polyimide, polyacrylonitrile, and nylon. Furthermore, regenerated celluloses such as rayon; cellulose derivatives such as cellulose acetate and nitrocellulose; pulp of synthetic resins such as polyethylene, polypropylene, acrylic and aramid; or fibers produced from natural products as the raw material sources, such as polylactic acid, polybutyric acid and polysuccinic acid, which are being actively studied in recent years for biochemical applications, are also included in the scope of the organic synthetic fibers. Among the synthetic fibers described above, polyester fibers are suitably used in view of heat resistance, chemical resistance, fiber diameter, the abundance of the kind of properties, or the like. Here, in the present invention, among the organic synthetic fibers, an organic synthetic fiber which is not intended for melt adhesion at a low temperature and has a conventional melting point, for example, a melting point of 140° C. to 300° C., is referred to as "main constituent fiber." Depending on the shape of the main constituent fiber, when a fiber having a fine fiber diameter is used, the pore diameter of a completed sheet is further decreased, and when a fiber having a large fiber diameter is used, the strength of the sheet is increased. When a short fiber is used, dispersibility in water during a wet papermaking process is enhanced, and when along fiber is used, the strength of the sheet is increased. In the present exemplary embodiment, a synthetic fiber having a fiber thickness of 0.05 decitex to 5.0 decitex, and preferably 0.1 decitex to 3.0 decitex, and having a length of 1 mm to 8 mm, and preferably a length in the range of 3 mm to 6 mm, is suitably used. Furthermore, the cross-sectional shape of the fiber can be appropriately selected as necessary, and is not limited in the present exemplary embodiment.

A binder fiber is mixed with the main constituent fiber for the purpose of enhancing the strength properties of manufactured products, or maintaining a sufficient sheet strength between a sheet-forming process and a winding process. Here, the "binder fiber" refers to an organic synthetic fiber in which the melting point of the fiber as a whole or the fiber surface (sheath portion) is lower by about 20° C., or by 20° C. or more, than the melting point of the main constituent fiber, and has an effect in which the fiber surface or the fiber as a whole undergoes melt adhesion as a result of heating by a drying process after papermaking or a thermal pressing process, and thereby physical strength is imparted to the sheet.

Regarding the binder fiber, there are available a type in which the entire constituent resin has a low melting point, and a type having a double structure having an inner side and an outer side, that is, a so-called core-sheath structure, in which only the surface is fused, and all of these can be used in the present exemplary embodiment. Suitably, an unstretched polyester fiber having a melting point of about 200° C. to 230° C. is used. Furthermore, the fiber thickness, length, shape of the cross-section, and the like can be selected according to the purpose, similarly to the main constituent fiber. For example, according to the present exemplary embodiment, a binder fiber having a fiber thickness of 0.1 decitex to 5.0 decitex, and preferably 0.5 decitex to 3.0 decitex, and a length of 1 mm to 8 mm, and preferably a length in the range of 3 mm to 6 mm, is suitably used. It is preferable that the binder resin have a resin composition which is the same as or close to the resin composition of the main constituent fiber; however, different kinds of resin compositions can also be used in accordance with the required characteristics. Furthermore, a vinylon binder fiber having a characteristic of melting under humid and hot conditions is also suitably used.

Exemplary embodiments of the present invention include a case in which only a main constituent fiber is incorporated as an organic synthetic fiber, and a case in which both a main constituent fiber and a binder fiber are incorporated. In the present exemplary embodiment, the ratio (mass ratio) of the main constituent fiber and the binder fiber is preferably in the range of main constituent fiber:binder fiber=100:0 to 50:50. When a sheet containing only a synthetic fiber that serves as the main constituent fiber, without any binder fiber mixed therein, is subjected to hot press processing, strands of the main constituent fiber can be caused to melt-adhere with each other; however, since the main constituent fiber is not intended for melt adhesion at a low temperature, it is necessary to raise the heating temperature at the time of hot press processing to a temperature close to the melting point of the main constituent fiber. When a binder fiber is incorporated into the main constituent fiber, fiber strands can be caused to melt-adhere with each other at a temperature lower than the melting point of the main constituent fiber. However, if the ratio of the binder fiber is more than 50% by mass, since the physical strength of the binder fiber itself is weaker than the physical strength of the main constituent fiber, the physical strength of the sheet (hereinafter, may be described simply as "strength") is decreased.

Among the fibers to be incorporated, the organic synthetic fibers are employed as the main constituent fiber of the nonwoven fabric by adjusting the mixing ratio of the organic synthetic fibers to 50% by mass or more, and preferably 70% by mass or more. At this time, if necessary, pulp-like raw materials, for example, cellulose-based pulp such as wood pulp for papermaking or cotton linter; inorganic fibers such as glass fiber, silica fiber and alumina fiber; inorganic filler materials such as calcium carbonate, talc and kaolin; or the like can also be incorporated in addition to the organic synthetic fibers.

Regarding the nonwoven fabric for semipermeable membrane support, for example, a wet laid nonwoven fabric that is produced by a wet papermaking method is used. Alternatively, a dry type nonwoven fabric can also be used. Among these, according to the present invention, a wet laid nonwoven fabric provides the effect of the present invention more effectively than a dry type nonwoven fabric. This is because, as compared with a dry type nonwoven fabric in which organic synthetic fibers as continuous long fibers constitute a main constituent element, a wet laid nonwoven fabric in which organic synthetic fibers as cut short fibers constitute a main constituent element, is likely to have high air permeability of the middle layer, and is likely to exhibit an anchor effect.

The nonwoven fabric before being subjected to a hot press processing is such that the effect of the present invention is exhibited by any of a single layer structure or a multilayer structure having two or more layers superimposed. A nonwoven fabric having a multilayer structure before being subjected to hot press processing may be formed of the same raw material in all the layers, or may be formed from different raw materials, as long as the effect of the present invention is not impaired. Furthermore, even with the same raw material, the fiber diameter and the fiber length of the organic synthetic fibers can be changed. When hot press processing is carried out using a thermal calender, if the nonwoven fabric has a single layer structure, the way of heat propagation is uniform, and accordingly, control of the pressure drops of the various layer regions based on the processing conditions can be easily implemented. On the other hand, if the nonwoven fabric has a multilayer structure, heat propagation may be changed at the dislocation parts where layers are brought into contact, and the control of pressure drop may not be achieved effectively.

Regarding the method for producing a wet laid nonwoven fabric, a so-called wet papermaking method in which organic synthetic fibers as raw materials are dispersed in water, subsequently the fibers are laminated on a papermaking wire, dehydrating the fibers through the lower part of the wire, and thereby forming a sheet, is used. Among others, a wet laid nonwoven fabric according to a wet papermaking method is particularly preferred because the network of constituent fibers is likely to be formed more uniformly than a dry type nonwoven fabric. The kind of the papermaking machine used in the wet papermaking method is not limited in the present exemplary embodiment, and for example, a single-sheet papermaking apparatus, or in the case of a continuous papermaking machine, a Fourdrinier papermaking machine, a short wire papermaking machine, a cylindrical wire papermaking machine, an inclined wire papermaking machine, a gap former, and a delta former can be used.

Since a sheet obtained after papermaking contains a large amount of water, the sheet is dried in a drying process. The drying method used at this time is not particularly limited, but hot air drying, infrared drying, drum drying, drying by a Yankee dryer and the like are suitably used. The drying temperature is desirably 100° C. to 160° C., and more desirably 105° C. to 140° C.

A wet laid nonwoven fabric or a dry type nonwoven fabric produced by the methods described above may be used directly as a semipermeable membrane support, but in many cases, the strength as a semipermeable membrane support is insufficient. Thus, in order to obtain a strength sufficient for a semipermeable membrane support, fibers are thermally welded by subjecting the fibers to hot press processing at a temperature near the melting point of the main constituent fiber, or a temperature near the melting point of the binder fiber, and thereby strength is increased. This treatment is carried out using various hot press processing apparatuses, but generally, a thermal calender apparatus is effective. For example, a method of using a metal roll nip calender that is capable of processing at a temperature of 160° C. or higher can be used, or if a resin roll having high heat resistance is available, a metal roll/resin roll soft nip calender can also be used.

The temperature conditions for the hot press processing is generally preferably in the range of 160° C. to 260° C., and more preferably in the range of 180° C. to 240° C.; however, depending on the kind of the synthetic fibers used, a lower temperature or a higher temperature may be desirable. For example, when a binder fiber is incorporated into a main constituent fiber, the fibers are thermally welded by subjecting the fibers to hot press processing at a temperature near the melting point of the binder fiber, and thereby strength is increased. The linear pressure is not particularly limited, but the linear pressure is preferably in the range of 50 kN/m to 250 kN/m, and more preferably in the range of 100 kN/m to 200 kN/m. Furthermore, in order for the nonwoven fabric to exhibit uniform performance over the entire web, it is desirable to treat the nonwoven fabric with a temperature profile or linear pressure profile that is as uniform as possible. The roll diameter of the thermal calender apparatus is appropriately selected depending on parameters such as the base material to be subjected to hot press processing, the nip pressure, and the speed. When a nonwoven fabric for semipermeable membrane support is produced using only a main constituent fiber without incorporating a binder fiber, the nonwoven fabric is subjected to hot press processing at a temperature near the melting point of the main constituent fiber.

The method for obtaining the nonwoven fabric for semipermeable membrane support of the present exemplary embodiment is not intended to be limited to the following method, but one example may be a method of utilizing the relationship between the fusion temperature and the line speed during the process of thermal fusion of organic synthetic fibers in the production of a support (nonwoven fabric). If the line speed is relatively slow, heat is conducted to the interior in the thickness direction of the nonwoven fabric, and the coated layer region, the middle layer region and the non-coated layer region are thermally fused uniformly. If the line has a speed exceeding a certain constant speed, heat cannot be easily conducted to the interior of the nonwoven fabric, thermal fusion in the middle layer region does not proceed, and the middle layer region is brought to a semi-molten state. However, if the line speed is further increased, thermal fusion in the middle layer region does not proceed further, and the middle layer region is almost in an unfused state. As a result, the coating liquid penetrates excessively into the nonwoven fabric and deteriorates the formation of a semipermeable membrane, and there rises a problem that the nonwoven fabric itself is detached in the middle layer region. In regard to the semi-molten state of the middle layer region, strict process management should be carried out so that a semi-molten state satisfying the relationship of "pressure drop per unit basis weight" of the middle layer region, coated layer region and non-coated layer region that will be described below, would be achieved. Examples of the thermal fusion process include a drying process of the papermaking process described previously, and hot press processing, and particularly, the general conditions of the hot press pressing are important because the conditions are largely affected.

According to the present invention, when the thermally fused state of the fibers in the middle layer region of the nonwoven fabric is made mild relative to the coated layer region and the non-coated layer region by utilizing the above-described methods or the like, compactness of the middle layer region is decreased (the middle layer region becomes bulky), and the pressure drop can be decreased. Here, in the present invention, pressure drop is used as an index of air permeability of the nonwoven fabric. The pressure drop indicates the resistance to air permeation when air is allowed to permeate through a nonwoven fabric, in terms of pressure difference, and the pressure drop is defined by the ventilation conditions at a face velocity of 5.3 cm/s. The unit is Pa. A higher pressure drop implies lower air permeability. Furthermore, the "pressure drop per unit basis weight" is obtained by dividing the pressure drop by the basis weight of the nonwoven fabric, and the unit is Pa/(g/m$^2$). Since the pressure drop is directly proportional to the basis weight, nonwoven fabrics having different basis weights can be compared at the same basis weight level. In the present invention, the "pressure drop per unit basis weight" is used in order to properly evaluate how much the pressure drop of the middle layer region having a portion of the basis weight has decreased relative to the pressure drop of the nonwoven fabric having the total basis weight.

In the present invention, the pressure dropper unit basis weight of the middle layer region excluding the coated layer region and the non-coated layer region, must be lower than the pressure drop per unit basis weight of the coated layer region and the pressure drop per unit basis weight of the non-coated layer region. If the value of the pressure drop per unit basis weight of the coated layer region is less than or equal to the value of the pressure drop per unit basis weight of the middle layer region, since the fiber fusion state of the semipermeable membrane-coated side surface is poor, fiber fluffs penetrate through the semipermeable membrane, and the surface properties of the semipermeable membrane are deteriorated. Furthermore, if the value of the pressure drop per unit basis weight of the non-coated layer region is less than or equal to the pressure drop per unit basis weight of the middle layer region, the semipermeable membrane coating liquid that has penetrated into the middle layer region penetrates excessively to the non-coated layer region, permeation-through of the resin occurs, and the surface properties (thickness uniformity) of the semipermeable membrane are deteriorated.

In the present invention, the pressure drop per unit basis weight of the middle layer region excluding the coated layer region and the non-coated layer region is in the range of 10% to 70%, and preferably in the range of 15% to 50%, relative to the pressure drop per unit basis weight of the nonwoven fabric before exclusion. If the pressure drop per unit basis weight is larger than 70%, the semipermeable membrane coating liquid cannot easily penetrate into the middle layer region, and the anchor effect of the present invention is not exhibited. If the pressure drop per unit basis weight is smaller than 10%, the semipermeable membrane coating liquid penetrates excessively to the middle layer region, and the surface properties (thickness uniformity) of the semipermeable membrane may be deteriorated, or permeation-through of the resin may occur.

The pressure drop of the nonwoven fabric after being subjected to hot press processing is preferably from 50 Pa to 3000 Pa, and more preferably from 80 Pa to 1500 Pa, as the pressure drop obtainable when the face velocity of the wet laid nonwoven fabric is 5.3 cm/second. If the pressure drop is less than 50 Pa, the semipermeable membrane coating liquid penetrates excessively to the nonwoven fabric, and the coated surface of the semipermeable membrane may become non-uniform, or permeation-through may occur. Furthermore, if the pressure drop is larger than 3000 Pa, to the contrary, since the semipermeable membrane coating liquid cannot easily penetrate into the sheet interior of the wet laid nonwoven fabric, the clinging properties of the coated semipermeable membrane to the wet laid nonwoven fabric surface are deteriorated, and the anchor effect of the present invention is not exhibited.

In order to make the coating suitability of the semipermeable membrane coating liquid to the nonwoven fabric more satisfactory, it is also necessary to increase the sheet density of the nonwoven fabric that serves as a base material. The sheet density is preferably 0.5 g/cm$^3$ or more, more preferably 0.6 g/cm$^3$ or more, and most preferably 0.7 g/cm$^3$ or more. If the sheet density is less than 0.5 g/cm$^3$, the semipermeable membrane coating liquid penetrates excessively to the nonwoven fabric, and the surface of the coated semipermeable membrane may become non-uniform, or permeation-through may occur. The upper limit of the sheet density is, for example, 1.0 g/cm$^3$.

The basis weight of the nonwoven fabric is preferably 30 g/m$^2$ to 200 g/m$^2$, and more preferably 50 g/m$^2$ to 150 g/m$^2$. If the basis weight of the nonwoven fabric is larger than 200 g/m², when the semipermeable membrane thus produced is formed into a module, the module may become excessively thick so that the area per module is decreased, and the filtration performance may decrease. If the basis weight is less than 30 g/m², the thickness is excessively small so that there is a risk of the occurrence of permeation-through of the semipermeable membrane coating liquid in the film-forming process. Furthermore, the thickness of the nonwoven fabric is preferably 30 µm to 400 µm, and more preferably 55 µm to 300 µm. If the thickness of the nonwoven fabric is more than 400 µm, when the semipermeable membrane thus produced is formed into a module, the module may become excessively thick so that the area per module is decreased, and the filtration performance may decrease. If the thickness is less than 30 µm, the thickness is excessively small so that there is a risk of the occurrence of permeation-through of the semipermeable membrane coating liquid in the film-forming process.

Smoothness of the nonwoven fabric can be represented by Bekk smoothness or the like. Generally, if the smoothness of the semipermeable membrane-coated surface side of a nonwoven fabric is low, the semipermeable membrane provided by coating a semipermeable membrane coating liquid is prone to have unevenness in the thickness, and the surface properties of the semipermeable membrane are deteriorated. To the contrary, if the smoothness is high, since the semipermeable membrane coating liquid can be coated more uniformly, unevenness of the thickness of the semipermeable membrane is reduced, and satisfactory surface properties of the semipermeable membrane are obtained. On the other hand, low smoothness of the semipermeable membrane-coated surface side of the nonwoven fabric leads to satisfactory clinging of the semipermeable membrane to the nonwoven fabric surface, and an anchor effect is likely to be exhibited. To the contrary, if smoothness is high, the semipermeable membrane has poor clinging properties to the nonwoven fabric surface so that an anchor effect is not easily exhibited, and consequently, the semipermeable membrane and the nonwoven fabric are prone to be detached. That is, the relationship between the surface properties and peeling strength with respect to the smoothness of the nonwoven fabric is a contradictory relationship. However, since the nonwoven fabric of the present invention is such that the middle layer region is in a semi-molten state, even if the smoothness of the semipermeable membrane-coated surface side of the nonwoven fabric becomes relatively higher, because the coating liquid penetrates into the middle layer region, an anchor effect is exhibited, and the semipermeable membrane and the nonwoven fabric are not easily detached, while at the same time, satisfactory surface properties of the semipermeable membrane are obtained. However, if the ratio of the pressure drop per unit basis weight of the middle layer region with respect to the pressure drop per unit basis weight of the nonwoven fabric is excessively large, when the semipermeable membrane-coated surface is highly smooth, it is difficult for the semipermeable membrane coating liquid to penetrate into the middle layer region, an anchor effect is not easily exhibited, and the semipermeable membrane and the nonwoven fabric are prone to be detached. To the contrary, if the ratio of the pressure drop per unit basis weight of the middle layer region with respect to the pressure dropper unit basis weight of the nonwoven fabric is excessively small, even if the surface is highly smooth, the semipermeable membrane coating liquid penetrates excessively to the middle layer region, and the surface properties of the semipermeable membrane are deteriorated.

EXAMPLES

Next, the present invention will be described more specifically by way of Examples, but the present invention is not intended to be limited to these Examples.

Example 1

<Preparation of Fiber Raw Material Slurry>

24 kg of a commercially available polyester main constituent fiber (trade name: EP133, manufactured by Kuraray Co., Ltd.) having a fiber thickness of 1.45 decitex and a cut length of 5 mm, and 6 kg of a commercially available polyester binder fiber (trade name: TR07N, manufactured by Teijin Fibers, Ltd.) having a fiber thickness of 1.2 decitex and a cut length of 5 mm were introduced into water and were dispersed for 5 minutes using a dispersing machine, to obtain a fiber raw material slurry having a fiber content concentration of 1% by mass.

<Preparation of Fiber Slurry>

Water was added to the fiber raw material slurry to dilute the whole system, and thus a fiber slurry having a fiber content concentration of 0.03% by mass was obtained.

<Production of Sheet>

This fiber slurry was introduced into a head box of a short wire papermaking machine to process the fiber slurry for papermaking, and then the fiber slurry was dried with a cylinder dryer having a surface temperature of 120° C. until the sheet completely dried, to obtain a continuous rolled base paper.

<Hot Press Processing>

The rolled base paper was subjected to hot press pressing under the conditions of a roll surface temperature of 195° C., a clearance between rolls of 80 µm, a linear pressure of 90 kN/m, and a line speed of 20 m/min, using a thermal calender apparatus with a hard nip of metal roll/metal roll, having a surface length of the metal rolls of 1170 mm and a roll diameter of 450 mm, and thus a nonwoven fabric for semipermeable membrane support having a basis weight of 78 g/m², a thickness of 97 µm, a sheet density of 0.80 g/cm³, and a pressure drop of 430 Pa was obtained.

Example 2

<Preparation of Fiber Raw Material Slurry>

The process was carried out in the same manner as in Example 1.

<Preparation of Fiber Slurry>

The process was carried out in the same manner as in Example 1.

<Production of Sheet>

The process was carried out in the same manner as in Example 1.

<Hot Press Processing>

The process was carried out in the same manner as in Example 1, except that the line speed used in Example 1 was changed to 18 m/min, and thus a nonwoven fabric for semipermeable membrane support having a basis weight of 78 g/m², a thickness of 98 µm, a sheet density of 0.80 g/cm³, and a pressure drop of 390 Pa was obtained.

Example 3

<Preparation of Fiber Raw Material Slurry>
The process was carried out in the same manner as in Example 1.
<Preparation of Fiber Slurry>
The process was carried out in the same manner as in Example 1.
<Production of Sheet>
The process was carried out in the same manner as in Example 1.
<Hot Press Processing>
The process was carried out in the same manner as in Example 1, except that the line speed used in Example 1 was changed to 16 m/min, and thus a nonwoven fabric for semipermeable membrane support having a basis weight of 80 g/m$^2$, a thickness of 99 μm, a sheet density of 0.81 g/cm$^3$, and a pressure drop of 450 Pa was obtained.

Example 4

<Preparation of Fiber Raw Material Slurry>
The process was carried out in the same manner as in Example 1.
<Preparation of Fiber Slurry>
The process was carried out in the same manner as in Example 1.
<Production of Sheet>
The process was carried out in the same manner as in Example 1.
<Hot Press Processing>
The process was carried out in the same manner as in Example 1, except that the roll surface temperature used in Example 1 was changed to 178° C., and the line speed was changed to 18 m/min, and thus a nonwoven fabric for semipermeable membrane support having a basis weight of 77 g/m$^2$, a thickness of 95 μm, a sheet density of 0.81 g/cm$^3$, and a pressure drop of 450 Pa was obtained.

Example 5

<Preparation of Fiber Raw Material Slurry>
The process was carried out in the same manner as in Example 1.
<Preparation of Fiber Slurry>
The process was carried out in the same manner as in Example 1.
<Production of Sheet>
The process was carried out in the same manner as in Example 1.
<Hot Press Processing>
The process was carried out in the same manner as in Example 1, except that the line speed used in Example 1 was changed to 26 m/min, and thus a nonwoven fabric for semipermeable membrane support having a basis weight of 79 g/m$^2$, a thickness of 98 μm, a sheet density of 0.81 g/cm$^3$, and a pressure drop of 310 Pa was obtained.

Example 6

<Preparation of Fiber Raw Material Slurry>
The process was carried out in the same manner as in Example 1.
<Preparation of Fiber Slurry>
The process was carried out in the same manner as in Example 1.
<Production of Sheet>
The process was carried out in the same manner as in Example 1.
<Hot Press Processing>
The rolled base paper described above was subjected to first hot press processing under the conditions of a roll surface temperature of 188° C., a clearance between rolls of 0 μm, a linear pressure of 90 kN/m, and a processing speed of 20 m/min, using a thermal calender apparatus with a soft nip of metal roll/elastic cotton roll, having a surface length of the metal roll of 1170 mm and a roll diameter of 450 mm. Subsequently, the surface of the base paper that was brought into contact with the metal roll was reversed, and the base paper was subjected to second hot press processing under the same conditions as those of the first hot press processing, to obtain a nonwoven fabric for semipermeable membrane support having a basis weight of 78 g/m$^2$, a thickness of 97 μm, a sheet density of 0.80 g/cm$^3$, and a pressure drop of 430 Pa.

Example 7

<Preparation of Fiber Raw Material Slurry>
The process was carried out in the same manner as in Example 1.
<Preparation of Fiber Slurry>
The process was carried out in the same manner as in Example 1.
<Production of Sheet>
The process was carried out in the same manner as in Example 1.
<Hot Press Processing>
The process was carried out in the same manner as in Example 1, except that the clearance between rolls used in Example 1 was changed to 70 μm, and the linear pressure was changed to 150 kN/m, and thus a nonwoven fabric for semipermeable membrane support having a basis weight of 77 g/m$^2$, a thickness of 89 μm, a sheet density of 0.87 g/cm$^3$, and a pressure drop of 730 Pa was obtained.

Example 8

<Preparation of Fiber Raw Material Slurry>
The process was carried out in the same manner as in Example 1.
<Preparation of Fiber Slurry>
The process was carried out in the same manner as in Example 1.
<Production of Sheet>
The process was carried out in the same manner as in Example 1.
<Hot Press Processing>
The process was carried out in the same manner as in Example 1, except that the clearance between rolls used in Example 1 was changed to 70 μm, the linear pressure was changed to 150 kN/m, and the line speed was changed to 17 m/min, and thus a nonwoven fabric for semipermeable membrane support having a basis weight of 78 g/m$^2$, a thickness of 90 μm, a sheet density of 0.87 g/cm$^3$, and a pressure drop of 770 Pa was obtained.

Example 9

<Preparation of Fiber Raw Material Slurry>
16 kg of a commercially available polyester main constituent fiber (trade name: EP133, manufactured by Kuraray Co., Ltd.) having a fiber thickness of 1.45 decitex and a cut length of 5 mm, 8 kg of a commercially available polyester main constituent fiber (trade name: TM04PN, manufactured by Teijin, Ltd.) having a fiber thickness of 0.1 decitex and a cut length of 5 mm, and 6 kg of a commercially available polyester binder fiber (trade name: TR07N, manufactured by Teijin Fibers, Ltd.) having a fiber thickness of 1.2 decitex and a cut length of 5 mm were introduced into water and were dispersed for 5 minutes using a dispersing machine, to obtain a fiber raw material slurry having a fiber content concentration of 1% by mass.

<Preparation of Fiber Slurry>

The process was carried out in the same manner as in Example 1.

<Production of Sheet>

The process was carried out in the same manner as in Example 1.

<Hot Press Processing>

The process was carried out in the same manner as in Example 1, except that the line speed used in Example 1 was changed to 18 m/min, and thus a nonwoven fabric for semipermeable membrane support having a basis weight of 78 g/m$^2$, a thickness of 97 µm, a sheet density of 0.80 g/cm$^3$, and a pressure drop of 640 Pa was obtained.

Example 10

<Preparation of Fiber Raw Material Slurry>

16 kg of a commercially available polyester main constituent fiber (trade name: EP133, manufactured by Kuraray Co., Ltd.) having a fiber thickness of 1.45 decitex and a cut length of 5 mm, 8 kg of a commercially available polyester main constituent fiber (trade name: EP303, manufactured by Kuraray Co., Ltd.) having a fiber thickness of 3.1 decitex and a cut length of 5 mm, and 6 kg of a commercially available polyester binder fiber (trade name: TR07N, manufactured by Teijin Fibers, Ltd.) having a fiber thickness of 1.2 decitex and a cut length of 5 mm were introduced into water and were dispersed for 5 minutes using a dispersing machine, to obtain a fiber raw material slurry having a fiber content concentration of 1% by mass.

<Preparation of Fiber Slurry>

The process was carried out in the same manner as in Example 1.

<Production of Sheet>

The process was carried out in the same manner as in Example 1.

<Hot Press Processing>

The process was carried out in the same manner as in Example 1, except that the roll surface temperature used in Example 1 was changed to 178° C., and the line speed was changed to 18 m/min, and thus a nonwoven fabric for semipermeable membrane support having a basis weight of 80 g/m$^2$, a thickness of 99 µm, a sheet density of 0.81 g/cm$^3$, and a pressure drop of 290 Pa was obtained.

Comparative Example 1

<Preparation of Fiber Raw Material Slurry>

The process was carried out in the same manner as in Example 1.

<Preparation of Fiber Slurry>

The process was carried out in the same manner as in Example 1.

<Production of Sheet>

The process was carried out in the same manner as in Example 1.

<Hot Press Processing>

The process was carried out in the same manner as in Example 1, except that the line speed used in Example 1 was changed to 9 m/min, and thus a nonwoven fabric for semipermeable membrane support having a basis weight of 78 g/m$^2$, a thickness of 96 µm, a sheet density of 0.81 g/cm$^3$, and a pressure drop of 420 Pa was obtained.

Comparative Example 2

<Preparation of Fiber Raw Material Slurry>

The process was carried out in the same manner as in Example 1.

<Preparation of Fiber Slurry>

The process was carried out in the same manner as in Example 1.

<Production of Sheet>

The process was carried out in the same manner as in Example 1.

<Hot Press Processing>

The process was carried out in the same manner as in Example 1, except that the line speed used in Example 1 was changed to 31 m/min, and thus a nonwoven fabric for semipermeable membrane support having a basis weight of 78 g/m$^2$, a thickness of 98 µm, a sheet density of 0.80 g/cm$^3$, and a pressure drop of 370 Pa was obtained.

Comparative Example 3

<Preparation of Fiber Raw Material Slurry>

The process was carried out in the same manner as in Example 1.

<Preparation of Fiber Slurry>

The process was carried out in the same manner as in Example 1.

<Production of Sheet>

The process was carried out in the same manner as in Example 1.

<Hot Press Processing>

The process was carried out in the same manner as in Example 1, except that the line speed used in Example 1 was changed to 12 m/min, and thus a nonwoven fabric for semipermeable membrane support having a basis weight of 80 g/m$^2$, a thickness of 97 µm, a sheet density of 0.82 g/cm$^3$, and a pressure drop of 460 Pa was obtained.

Comparative Example 4

<Preparation of Fiber Raw Material Slurry>

The process was carried out in the same manner as in Example 1.

<Preparation of Fiber Slurry>

The process was carried out in the same manner as in Example 1.

<Production of Sheet>

The process was carried out in the same manner as in Example 1.

<Hot Press Processing>

The rolled base paper described above was subjected to only one time of hot press processing under the conditions of a roll surface temperature of 188° C., a clearance between rolls of 0 µm, a linear pressure of 90 kN/m, and a processing speed of 20 m/min, using a thermal calender apparatus with a soft nip of metal roll/elastic cotton roll, having a surface length of the metal roll of 1170 mm and a roll diameter of 450 mm, and thus a nonwoven fabric for semipermeable membrane support having a basis weight of 78 g/m$^2$, a thickness of 100 µm, a sheet density of 0.78 g/cm$^3$, and a pressure drop of 250 Pa was obtained. Meanwhile, the semipermeable membrane-coated side surface of the nonwoven fabric thus obtained was taken as the surface side that was brought into contact with the metal roll.

Comparative Example 5

<Preparation of Fiber Raw Material Slurry>
The process was carried out in the same manner as in Example 1.
<Preparation of Fiber Slurry>
The process was carried out in the same manner as in Example 1.
<Production of Sheet>
The process was carried out in the same manner as in Example 1.
<Hot Press Processing>
The process was carried out in the same manner as in Comparative Example 4. Meanwhile, the semipermeable membrane-coated side surface of the nonwoven fabric thus obtained was taken as the surface side that was brought into contact with the resin cotton roll.

Comparative Example 6

<Preparation of Fiber Raw Material Slurry>
The process was carried out in the same manner as in Example 1.
<Preparation of Fiber Slurry>
The process was carried out in the same manner as in Example 1.
<Production of Sheet>
The process was carried out in the same manner as in Example 1.
<Hot Press Processing>
The process was carried out in the same manner as in Example 1, except that the clearance between rolls used in Example 1 was changed to 70 μm, the linear pressure was changed to 150 kN/m, and the line speed was changed to 12 m/min, and thus a nonwoven fabric for semipermeable membrane support having a basis weight of 79 g/m$^2$, a thickness of 90 μm, a sheet density of 0.88 g/cm$^3$, and a pressure drop of 970 Pa was obtained.

Comparative Example 7

<Preparation of Fiber Raw Material Slurry>
The process was carried out in the same manner as in Example 1.
<Preparation of Fiber Slurry>
The process was carried out in the same manner as in Example 1.
<Production of Sheet>
The process was carried out in the same manner as in Example 1.
<Hot Press Processing>
The process was carried out in the same manner as in Example 1, except that the clearance between rolls used in Example 1 was changed to 70 μm, the linear pressure was changed to 150 kN/m, and the line speed was changed to 35 m/min, and thus a nonwoven fabric for semipermeable membrane support having a basis weight of 79 g/m$^2$, a thickness of 90 a sheet density of 0.88 g/cm$^3$, and a pressure drop of 540 Pa was obtained.

Comparative Example 8

<Preparation of Fiber Raw Material Slurry>
The process was carried out in the same manner as in Example 9.
<Preparation of Fiber Slurry>
The process was carried out in the same manner as in Example 1.
<Production of Sheet>
The process was carried out in the same manner as in Example 1.
<Hot Press Processing>
The process was carried out in the same manner as in Example 1, except that the line speed used in Example 1 was changed to 12 m/min, and thus a nonwoven fabric for semipermeable membrane support having a basis weight of 78 g/m$^2$, a thickness of 98 μm, a sheet density of 0.80 g/cm$^3$, and a pressure drop of 810 Pa was obtained.

Comparative Example 9

<Preparation of Fiber Raw Material Slurry>
The process was carried out in the same manner as in Example 9.
<Preparation of Fiber Slurry>
The process was carried out in the same manner as in Example 1.
<Production of Sheet>
The process was carried out in the same manner as in Example 1.
<Hot Press Processing>
The process was carried out in the same manner as in Example 1, except that the line speed used in Example 1 was changed to 35 m/min, and thus a nonwoven fabric for semipermeable membrane support having a basis weight of 77 g/m$^2$, a thickness of 98 μm, a sheet density of 0.79 g/cm$^3$, and a pressure drop of 480 Pa was obtained.

The nonwoven fabrics for semipermeable membrane support obtained in the Examples were evaluated by the following methods.
<Measurement of Basis Weight>
The measurement was carried out according to JIS P 8124:1998 "Paper and board—Determination of grammage." The unit was g/m$^2$.
<Measurement of Pressure Drop>
The pressure drop obtainable when air was blown to a filtering medium having an effective area of 100 cm$^2$ at a face velocity of 5.3 cm/sec using a home-made apparatus, was measured using a fine pressure difference meter. The unit was Pa.

Meanwhile, the pressure drop per basis weight was determined by the following calculation formula:

$$\text{(Pressure drop per basis weight)} = \text{(Pressure drop)} / \text{(basis weight)} \quad \text{(Mathetmatical Formula 1)}$$

<Production of Middle Layer Region Sample>
In a test specimen for which the basis weight and the pressure drop had been measured in advance, first, peeling was performed little by little at the semipermeable membrane-coated side surface using an adhesive tape. While the weight of the test specimen remaining after the peeling was measured, peeling was performed, and a predetermined portion of the total basis weight was removed. Meanwhile, "removal of a predetermined portion of the total basis weight" means removal of a targeted 25% portion of the nonwoven fabric relative to the total basis weight of the nonwoven fabric, and at this time, since there occurs an error in the amount removed, the phrase means, in consideration of this error, removal of a portion in the range of 22.5% to 27.5% (25% portion to be removed±an error of 10% thereof) of the basis weight. The pressure drop of the coated layer region and the pressure drop per unit basis weight of the coated layer region were determined as follows.

(Pressure drop of coated layer region)=(Pressure drop before peeling)−(pressure drop after peeling)    (Mathematical Formuala 2)

(per unit basis weight of coated layer region)=(Pressure drop of coated layer region of Mathematical Formula 2)/(basis weight removed by peeling)    (Mathematical Formula 3)

The basis weight removed by peeling of (Mathematical Formula 3) is the basis weight of a portion removed as the coated layer region.

Next, using the test specimen having the coated layer region removed therefrom, the same process was carried out from the non-semipermeable membrane-coated surface, subsequently peeling was performed little by little using an adhesive tape to remove a predetermined portion of the total basis weight, and thus the middle layer region was obtained. The pressure drop of the non-coated layer region and the pressure drop per unit basis weight of the non-coated layer region were determined as follows.

(Pressure drop of non-coated layer region)=(Pressure drop before peeling)−(pressure drop after peeling of Mathematical Formula 2)    (Mathematical Formula 4)

(Pressure dropper unit basis weight of non-coated layer region)=(Pressure drop of non-coated layer region of Mathematical Formula 4)/(basis weight removed by peeling)    (Mathetmatical Formula 5)

The basis weight removed by peeling of (Mathematical Formula 5) is the basis weight of a portion removed as the non-coated layer region.

(Pressure drop of middle layer region)=(Pressure drop after peeling of Mathematical Formula 4)    (Mathematical Formula 6)

The pressure drop after peeling of (Mathematical Formula 4) is the pressure drop of the sample left with only the middle layer region by removing the coated layer region and the non-coated layer region.

(Pressure drop per unit basis weight of middle layer region)=(Pressure drop of middle layer region of Mathematical Formula 6)/(basis weight of middle layer region)    (Mathematical Formual 7)

Meanwhile, the ratio of the pressure drop per unit basis weight of the middle layer region, with the coated layer region and the non-coated layer region removed, with respect to the pressure drop per unit basis weight of the nonwoven fabric before removal (that is, the test specimen prepared initially) was determined by the following formula:

(Ratio of pressure drop per unit basis weight of middle layer region after removal with respect to the pressure drop per unit basis weight of nonwoven fabric before removal)=(Pressure drop per unit basis weight of middle layer region of Mathematical Formula 7)/(pressure drop per basis weight of Mathematical Formula 1)×100    (Mathetical Formula 8)

<Formation of Semipermeable Membrane-Coated Layer>

A sample with an A4 size was cut from each of the nonwoven fabrics for semipermeable membrane support obtained in the Examples, a 20 mass % DMF (dimethylformamide) solution of a polysulfone resin was applied on the semipermeable membrane support using a Mayer Bar #12, subsequently the sample was immersed in water to solidify the coated layer, and thus a semipermeable membrane was formed. The film thickness of the semipermeable membrane was adjusted to 50 μm after drying.

<Peeling Strength of Coated Layer>

The above-described samples of the nonwoven fabrics for support on which semipermeable membranes were formed, were passed through the hands 10 times by rubbing with the hands, and then the peeled state of the coated surfaces was evaluated by visual inspection. A sample in which the coated surface was completely peeled off from the support was rated as× (having a problem for practical use); a sample in which signs of peeling of a portion were seen was rated as Δ (level below the lower limit of practical usability); and a sample in which the coated surface was not peeled off was rated as ○ (no problem for practical use). Samples rated as ○ and Δ were regarded as acceptable, and samples rated as × were regarded as unacceptable.

<Surface Properties of Coated Layer (Thickness Uniformity)>

For the above-described samples of the nonwoven fabrics for support on which semipermeable membrane-coated layers were formed, the surface state of the coated surfaces was evaluated by visual inspection. A sample in which surface unevenness was seen on the coated surface was rated as × (having a problem for practical use); a sample in which surface unevenness was slightly seen was rated as Δ (level below the lower limit of practical usability); and a sample without any surface unevenness was rated as ○ (no problem for practical use). Samples rated as ○ and Δ were regarded as acceptable, and samples rated as × were regarded as unacceptable.

<Resin Permeation-Through>

For the above-described samples of the nonwoven fabrics for support on which semipermeable membrane-coated layers were formed, the state of permeation-through of the semipermeable membrane coating liquid in the non-coated surface was evaluated by visual inspection. A sample in which permeation-through was seen at the non-coated surface was rated as × (having a problem for practical use); a sample in which signs of permeation-through were seen was rated as Δ (level below the lower limit of practical usability); and a sample without any permeation-through was rated as ○ (no problem for practical use) . Samples rated as ○ and Δ were regarded as acceptable, and samples rated as × were regarded as unacceptable.

TABLE 1

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Fiber blend | | | PET main constituent 1.45 dtex, 5 mm, 24 kg/ PET binder 1.2 dtex 5 mm, 6 kg | PET main constituent 1.45 dtex, 5 mm, 24 kg/ PET binder 1.2 dtex 5 mm, 6 kg | PET main constituent 1.45 dtex, 5 mm, 24 kg/ PET binder 1.2 dtex 5 mm, 6 kg | PET main constituent 1.45 dtex, 5 mm, 24 kg/ PET binder 1.2 dtex 5 mm, 6 kg | PET main constituent 1.45 dtex, 5 mm, 24 kg/ PET binder 1.2 dtex 5 mm, 6 kg | PET main constituent 1.45 dtex, 5 mm, 24 kg/ PET binder 1.2 dtex, 5 mm, 6 kg | PET main constituent 1.45 dtex, 5 mm, 24 kg/ PET binder 1.2 dtex 5 mm, 6 kg | PET main constituent 1.45 dtex, 5 mm, 24 kg/ PET binder 1.2 dtex 5 mm, 6 kg | PET main constituent 1.45 dtex, 5 mm, 16 kg/ PET main constituent 0.1 dtex, 5 mm, 8 kg/ PET binder 1.2 dtex, 5 mm, 6 kg | PET main constituent 1.45 dtex, 5 mm, 16 kg/ PET main constituent 3.1 dtex, 5 mm, 8 kg/ PET binder 1.2 dtex, 5 mm, 6 kg |
| Hot press processing | Roll | | Metal/metal | Metal/metal | Metal/metal | Metal/metal | Metal/metal | Metal/cotton (2 Passes for front and back) | Metal/metal | Metal/metal | Metal/metal | Metal/metal |
| | Temperature, °C. | | 195 | 195 | 195 | 178 | 195 | 188 | 195 | 195 | 195 | 178 |
| | Clearance μm | | 80 | 80 | 80 | 80 | 80 | 0 | 70 | 70 | 80 | 80 |
| | Linear pressure kN/m | | 90 | 90 | 90 | 90 | 90 | 90 | 150 | 150 | 90 | 90 |
| | Line speed m/min | | 20 | 18 | 16 | 18 | 26 | 20 | 20 | 17 | 18 | 18 |
| Basis weight g/m² | | | 78 | 78 | 80 | 77 | 79 | 78 | 77 | 78 | 77 | 80 |
| Pressure drop Pa | | | 430 | 390 | 450 | 450 | 310 | 430 | 730 | 770 | 640 | 290 |
| Pressure drop per basis weight Pa/(g/m²) | | | 5.5 | 5.0 | 5.6 | 5.8 | 3.9 | 5.5 | 9.5 | 9.9 | 8.3 | 3.6 |
| Basis weight of coated layer region g/m² | | | 19 | 20 | 20 | 19 | 21 | 18 | 19 | 20 | 20 | 19 |
| Pressure drop of coated layer region Pa | | | 203 | 161 | 133 | 246 | 153 | 188 | 322 | 274 | 237 | 127 |
| Pressure drop per unit basis weight of coated layer region Pa/(g/m²) | | | 10.7 | 8.1 | 6.7 | 12.9 | 7.3 | 10.4 | 16.9 | 13.7 | 11.9 | 6.7 |

TABLE 1-continued

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Basis weight of non-coated layer region | g/m² | 18 | 21 | 21 | 19 | 19 | 19 | 20 | 19 | 19 | 19 |
| Pressure drop of non-coated layer region | Pa | 181 | 140 | 167 | 169 | 139 | 201 | 309 | 285 | 243 | 120 |
| Pressure drop per unit basis weight of non-coated layer region | Pa/(g/m²) | 10.1 | 6.7 | 8.0 | 8.9 | 7.3 | 10.6 | 15.5 | 15.0 | 12.8 | 63 |
| Basis weight of middle layer region | g/m² | 41 | 37 | 39 | 39 | 39 | 41 | 38 | 39 | 38 | 42 |
| Pressure drop of middle layer region | Pa | 46 | 89 | 150 | 35 | 18 | 41 | 99 | 211 | 160 | 43 |
| Pressure drop per unit basis weight of middle layer region | Pa/(g/m²) | 1.12 | 2.41 | 3.85 | 0.90 | 0.46 | 1.00 | 2.61 | 5.41 | 4.21 | 1.02 |
| Ratio of Pressure drop per unit basis weight of middle layer region with respect to Pressure drop per unit basis weight | % | 20.4 | 48.1 | 68.4 | 15.4 | 11.8 | 18.1 | 27.5 | 54.8 | 50.7 | 28.2 |
| Peeling strength of coated layer | | ○ | ○ | △ | ○ | ○ | ○ | ○ | ○ | ○ | ○ |
| Surface properties of coated layer | | ○ | ○ | ○ | ○ | △ | ○ | ○ | ○ | ○ | ○ |
| Resin permeation-through | | ○ | ○ | ○ | ○ | △ | ○ | ○ | ○ | ○ | ○ |
| Bekk smoothness Coated surface | S | 24.7 | 30.2 | 33.6 | 11.7 | 14.0 | 27.9 | 46.6 | 50.3 | 38.9 | 9.4 |
| Same Non-coated surface | S | 23.5 | 28.6 | 34.9 | 9.5 | 14.3 | 28.3 | 45.1 | 52.8 | 38.3 | 8.2 |

TABLE 2

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Fiber blend | | PET main constituent 1.45 dtex, 5 mm, 24 kg/ PET binder 1.2 dtex, 5 mm, 6 kg | PET main constituent 1.45 dtex, 5 mm, 24 kg/ PET binder 1.2 dtex, 5 mm, 6 kg | PET main constituent 1.45 dtex, 5 mm, 24 kg/ PET binder 1.2 dtex, 5 mm, 6 kg | PET main constituent 1.45 dtex, 5 mm, 24 kg/ PET binder 1.2 dtex, 5 mm, 6 kg | PET main constituent 1.45 dtex, 5 mm, 24 kg/ PET binder 1.2 dtex, 5 mm, 6 kg | PET main constituent 1.45 dtex, 5 mm, 24 kg/ PET binder 1.2 dtex, 5 mm, 6 kg | PET main constituent 1.45 dtex, 2 5 mm, 4 kg/ PET binder 1.2 dtex, 5 mm, 6 kg | PET main constituent 1.45 dtex, 5 mm, 16 kg/ PET main constituent 0.1 dtex, 5 mm 8 kg/ PET binder 1.2 dtex, 5 mm, 6 kg | PET main constituent 1.45 dtex, 5 mm, 16 kg/ PET main constituent 0.1 dtex, 5 mm 8 kg/ PET binder 1.2 dtex, 5 mm, 6 kg |
| Hot press processing | Roll | Metal/metal | Metal/metal | Metal/metal | Metal/cotton (1 pass for single surface only) | Metal/cotton (1 pass for single surface only) | Metal/metal | Metal/metal | Metal/metal | Metal/metal |
| | Temperature, °C. | 195 | 195 | 195 | 188 | 188 | 195 | 195 | 195 | 195 |
| | Clearance μm | 80 | 80 | 80 | 0 | 0 | 70 | 70 | 80 | 80 |
| | Linear pressure kN/m | 90 | 90 | 90 | 90 | 90 | 150 | 150 | 90 | 90 |
| | Line speed m/min | 9 | 31 | 12 | 20 | 20 | 12 | 35 | 12 | 35 |
| Basis weight | g/m² | 78 | 78 | 80 | 78 | 79 | 79 | 79 | 78 | 77 |
| Pressure drop | Pa | 420 | 370 | 460 | 250 | 260 | 970 | 540 | 810 | 480 |
| Pressure drop per basis weight | Pa/(g/m²) | 5.4 | 4.7 | 5.8 | 3.2 | 3.3 | 12.3 | 6.8 | 10.4 | 6.2 |
| Basis weight of coated layer region | g/m² | 18 | 18 | 20 | 18 | 20 | 19 | 20 | 20 | 18 |
| Pressure drop of coated layer region | Pa | 113 | 180 | 144 | 219 | 10 | 275 | 266 | 247 | 228 |
| Pressure drop per unit basis weight of coated layer region | Pa/(g/m²) | 6.3 | 10.0 | 7.2 | 12.2 | 0.50 | 14.5 | 13.3 | 12.4 | 12.7 |
| Basis weight of non-coated layer region | g/m² | 18 | 19 | 19 | 20 | 20 | 18 | 18 | 18 | 19 |
| Pressure drop of non-coated layer region | Pa | 106 | 178 | 131 | 8 | 228 | 286 | 257 | 240 | 240 |

TABLE 2-continued

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Pressure drop per unit basis weight of non-coated layer region | Pa/(g/m²) | 5.9 | 9.4 | 6.9 | 0.40 | 11.4 | 15.9 | 14.3 | 13.3 | 12.6 |
| Basis weight of middle layer region | g/m² | 42 | 41 | 41 | 40 | 39 | 42 | 41 | 40 | 40 |
| Pressure drop of middle layer region | Pa | 201 | 12 | 185 | 23 | 22 | 409 | 17 | 323 | 12 |
| Pressure drop per unit basis weight of middle layer region | Pa/(g/m²) | 4.79 | 0.29 | 4.51 | 0.58 | 0.56 | 9.74 | 0.41 | 8.08 | 0.30 |
| Ratio of Pressure drop per unit basis weight of middle layer region with respect to Pressure drop per unit basis weight | % | 88.9 | 6.2 | 78.5 | 17.9 | 17.1 | 79.3 | 6.1 | 77.8 | 4.8 |
| Peeling strength of coated layer |  | X | ○ | X | ○ | ○ | X | ○ | X | ○ |
| Surface properties of coated layer |  | ○ | X | ○ | X | X (fluffs) | ○ | ○ | ○ | X |
| Resin permeation-through |  | ○ | X | ○ | X | ○ | ○ | X | ○ | X |
| Bekk smoothness Coated surface | S | 42.5 | 5.8 | 38.1 | 23.4 | 5.3 | 62.6 | 36.1 | 49.0 | 31.2 |
| Same Non-coated surface | S | 39.8 | 4.5 | 37.0 | 4.9 | 25.2 | 60.4 | 38.1 | 49.3 | 32.0 |

The results are summarized in Table 1 and Table 2. From the results of Table 1 and Table 2, it can be seen that in Example 1 and Example 2 in which the ratios of the pressure drop per unit basis weight of the middle layer region with respect to the pressure drop per basis weight were in the defined range, the peeling strength of the coated layer, the surface properties of the coated layer, and the resin permeation-through were at acceptable levels, and an appropriate degree of the semi-molten state of the middle layer region was obtained. Furthermore, Example 4 exhibited a difference in the roll surface temperature of the thermal calender, from Examples 1 and 2; however, it can be seen that when the line speed is appropriately selected, an appropriate degree of the semi-molten state of the middle layer region is obtained, and the sample was at an acceptable level. In Example 3, the ratio of the pressure drop per unit basis weight of the middle layer region with respect to the pressure drop per basis weight was close to the upper limit of the defined range, and melting of the middle layer region proceeded to a certain degree, so that the sample was at an acceptable level; however, the peeling strength of the coated layer was at a level below the lower limit of practical usability. In Example 5, the ratio of the pressure drop per unit basis weight of the middle layer region with respect to the pressure drop per basis weight was close to the lower limit of the defined range, and the degree of melting of the middle layer region was relatively low, so that the sample was at an acceptable level; however, the surface properties of the coated layer and the resin permeation-through were at levels below the lower limit of practical usability.

On the other hand, Comparative Example 1 and Comparative Example 3 are examples in which the ratio of the pressure drop per unit basis weight of the middle layer region with respect to the pressure drop per basis weight was higher than the upper limit, and the peeling strength of the coated layer was deteriorated. It is understood that the anchor effect of the semipermeable membrane-coated layer to the support was weakened. Comparative Example 2 is an example in which the ratio of the pressure drop per unit basis weight of the middle layer region with respect to the pressure drop per basis weight was lower than the lower limit, and the surface properties of the coated layer and the resin permeation-through were deteriorated. It is understood that the semipermeable membrane coating liquid had penetrated excessively.

Example 6 is an example of a soft nip thermal calender. It can be seen that when the hot press processing conditions are appropriately selected, and the nonwoven fabric base paper is processed on both surfaces, an appropriate degree of semi-molten state of the middle layer region is obtained, and the sample is at an acceptable level. To the contrary, Comparative Example 4 and Comparative Example 5 are examples in which only one surface of the nonwoven fabric base paper was subjected to hot press processing. In Comparative Example 4, a semipermeable membrane coating liquid was coated on the surface that was brought into contact with the metal roll; however, since the degree of the molten state of the surface in contact with the elastic cotton roll was low, the semipermeable membrane coating liquid penetrated excessively, and the surface properties of the coated layer and the resin permeation-through were deteriorated. In Comparative Example 5, in contrast, a semipermeable membrane coating liquid was coated on the surface that was brought into contact with the elastic cotton roll, and the peeling strength of the coated layer and the resin permeation-through were at acceptable levels; however, since the degree of the fiber molten state of the coated surface was low, fiber fluffs penetrated through the coated layer, and the surface properties of the coated layer were deteriorated.

Examples 7 and 8 are examples in which the linear pressure was increased by narrowing the clearance between hot rolls. As the sheet density increased, the coated surface and the non-coated surface both had increased smoothness, and there was a concern about the anchor effect of the semipermeable membrane-coated layer to the support being weakened; however, since the ratio of the pressure drop per unit basis weight of the middle layer region with respect to the pressure drop per basis weight was in the defined range, the peeling strength of the coated layer was satisfactory. In contrast, in Comparative Example 6, the ratio of the pressure drop per unit basis weight of the middle layer region with respect to the pressure drop per basis weight was higher than the upper limit, and the peeling strength of the coated layer was deteriorated. Furthermore, in Comparative Example 6, the ratio of the pressure drop per unit basis weight of the middle layer region with respect to the pressure drop per basis weight was less than the lower limit, and the resin permeation-through was deteriorated.

Example 9 is an example in which the pressure drop was controlled by incorporating a PET main constituent fiber having a fine diameter to the fiber blend, and Example 10 is an example in which the pressure drop was controlled by mixing and incorporating a PET main constituent fiber having a large diameter. Since the ratio of the pressure drop per unit basis weight of the middle layer region with respect to the pressure drop per basis weight was in the defined range in both cases, the peeling strength of the coated layer, the surface properties of the coated layer, and the resin permeation-through were at acceptable levels. In contrast, in Comparative Example 8, the ratio of the pressure drop per unit basis weight of the middle layer region with respect to the pressure drop per basis weight was higher than the upper limit, and the peeling strength of the coated layer was deteriorated. Furthermore, in Comparative Example 9, the ratio of the pressure drop per unit basis weight of the middle layer region with respect to the pressure drop per basis weight was less than the lower limit, and the resin permeation-through and the surface properties of the coated layer were deteriorated.

What is claimed is:

1. A nonwoven fabric semipermeable membrane support,
wherein the nonwoven fabric semipermeable membrane support comprises a nonwoven fabric that contains organic synthetic fibers as a primary component,
wherein the organic synthetic fibers include (i) a main constituent fiber and (ii) a binder fiber that is adhered to the main constituent fiber, wherein the main constituent fiber is a polyester fiber of 0.05 decitex to 5.0 decitex that has a length of 1 mm to 8 mm, and the binder fiber is a polyester fiber of 0.1 decitex to 5.0 decitex that has a length of 1 mm to 8 mm,
wherein the nonwoven fabric has a first surface and a second surface which is opposite to the first surface of the nonwoven fabric,
wherein the first surface of the nonwoven fabric has thereon a first region extending from the first surface in a thickness direction proportionally in the range of 22.5% to 27.5% to the total basis weight of the nonwoven fabric,
wherein the second surface of the nonwoven fabric has thereon a second region extending from the second surface in a thickness direction proportionally in the range of 22.5% to 27.5% to the total basis weight of the nonwoven fabric, wherein the nonwoven fabric has a middle region between the first region and the second region, wherein the main constituent fiber and the binder fiber are in a mass ratio of main constituent fiber to binder fiber and the mass ratio is the same in each of the first region, the middle region, and the second region, wherein only the middle region has a pressure drop per unit basis weight that is lower than a pressure drop per unit basis weight of the first region and a pressure drop per unit basis weight of the second region, and the pressure drop per unit basis weight of only the middle region is in the range of 10% to 70% relative to a pressure drop per unit basis weight of the nonwoven fabric, wherein the first region and the second region have a difference in pressure drop per unit basis weight of at most 4, and wherein the middle region is less compact than the first region and the second region.

2. The nonwoven fabric semipermeable membrane support according to claim 1, wherein the nonwoven fabric is a wet laid nonwoven fabric.

3. The nonwoven fabric semipermeable membrane support according to claim 2, wherein the wet laid nonwoven fabric has a single layer structure.

4. The nonwoven fabric semipermeable membrane support according to claim 1, wherein in the nonwoven fabric contains only organic synthetic fibers.

5. The nonwoven fabric semipermeable membrane support according to claim 1, wherein the main constituent fiber is a plurality of main constituent fibers and the plurality of main constituent fibers has a single fiber diameter and a single fiber length.

6. The nonwoven fabric semipermeable membrane support according to claim 2 wherein the main constituent fiber is a plurality of main constituent fibers and the plurality of main constituent fibers has a single fiber diameter and a single fiber length.

7. The nonwoven fabric semipermeable membrane support according to claim 4, the main constituent fiber is a plurality of main constituent fibers and the plurality of main constituent fibers has a single fiber diameter and a single fiber length.

8. The nonwoven fabric semipermeable membrane support according to claim 1, wherein (1) the binder fiber has a melting point that is at least about 20° C. less than a melting point of the main constituent fiber, or (2) the binder fiber has a core-sheath structure and the sheath portion of the binder fiber has a melting point that is at least about 20° C. less than a melting point of the main constituent fiber.

9. The nonwoven fabric semipermeable membrane support according to claim 1, wherein the binder fiber is an unstretched polyester fiber.

* * * * *